United States Patent
Schoepe et al.

(10) Patent No.: US 9,518,880 B2
(45) Date of Patent: Dec. 13, 2016

(54) METHOD FOR PRODUCING A MAGNET UNIT FOR A SENSOR DEVICE OF A MOTOR VEHICLE, MAGNET UNIT, SENSOR DEVICE AND MOTOR VEHICLE

(71) Applicant: VALEO Schalter und Sensoren GmbH, Bietigheim-Bissingen (DE)

(72) Inventors: Roman Schoepe, Maulbronn (DE); Ekkehart Froehlich, Nordheim (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 14/781,971

(22) PCT Filed: Feb. 24, 2014

(86) PCT No.: PCT/EP2014/053499
§ 371 (c)(1),
(2) Date: Oct. 2, 2015

(87) PCT Pub. No.: WO2014/161692
PCT Pub. Date: Oct. 9, 2014

(65) Prior Publication Data
US 2016/0054187 A1     Feb. 25, 2016

(30) Foreign Application Priority Data
Apr. 5, 2013   (DE) .......................... 10 2013 006 567

(51) Int. Cl.
*G01L 3/00*     (2006.01)
*G01L 3/10*     (2006.01)

(52) U.S. Cl.
CPC ..................................... *G01L 3/104* (2013.01)

(58) Field of Classification Search
CPC .............. G01L 3/10; G01L 3/104; G01L 3/08; G01L 3/1457; G01L 25/003; G01L 3/24; H01F 17/0013
(Continued)

(56) References Cited

U.S. PATENT DOCUMENTS

2004/0194560 A1* 10/2004 Froehlich ................ G01L 3/104
73/862.333
2011/0043198 A1* 2/2011 Ruetz ................. B62D 15/0215
324/207.25

FOREIGN PATENT DOCUMENTS

DE     198 36 451 A1     5/2000
DE     102 40 049 A1     4/2003
(Continued)

OTHER PUBLICATIONS

Valeo Schalter & Sensoren GMBH, Magnet assembly for a torque and/ or rotational angle sensor arrangement with a magnetic ring and production method, DE 102009039082 A1, Mar. 3, 2011.*

(Continued)

*Primary Examiner* — Lisa Caputo
*Assistant Examiner* — Nigel Plumb
(74) *Attorney, Agent, or Firm* — Osha Liang LLP

(57) ABSTRACT

The invention relates to a method for producing a magnet unit (1) for a sensor device for detecting a measured variable which characterizes a rotational state of a steering shaft of a motor vehicle, by way of provision of an annular magnet element (3), provision of a sleeve (2) for connecting the magnet unit (1) to a shaft part of the steering shaft, and connection of the magnet element (3) to the sleeve (2), the sleeve (2) being configured with a main body (6) and a multiplicity of tabs (7) which protrude from the main body (6), and the connection comprising the tabs (7) being embed- (Continued)

ded into respective cut-outs (5) of the magnet element (3) with heating of the magnet element (3).

12 Claims, 1 Drawing Sheet

(58) Field of Classification Search
USPC .......................... 73/862, 862.325, 862.321, 862.191,73/862.08; 29/602.1
See application file for complete search history.

(56) References Cited

FOREIGN PATENT DOCUMENTS

| | | |
|---|---|---|
| DE | 10 2005 060 519 A1 | 6/2007 |
| DE | 10 2006 051 611 A1 | 5/2008 |
| DE | 10 2007 059 364 A1 | 8/2008 |
| DE | 10 2007 043 502 A1 | 4/2009 |
| DE | 10 2008 009 290 A1 | 8/2009 |
| DE | 10 2008 011 448 A1 | 9/2009 |
| DE | 10 2009 039082 A1 | 3/2011 |
| DE | 10 2010 020 599 A1 | 11/2011 |
| DE | 10 2010 039 812 A1 | 3/2012 |
| EP | 1 123 794 A2 | 8/2001 |

OTHER PUBLICATIONS

Baermann Max GMBH, Resinous part ith high rate of filling, EP 1123794, Aug. 16, 2001.*
International Search Report issued in PCT/EP2014/053499 mailed on May 27, 2014 (2 pages).
German Search Report issued in 10 2013 006 567.4 mailed on Oct. 15, 2013 (7 pages).

* cited by examiner

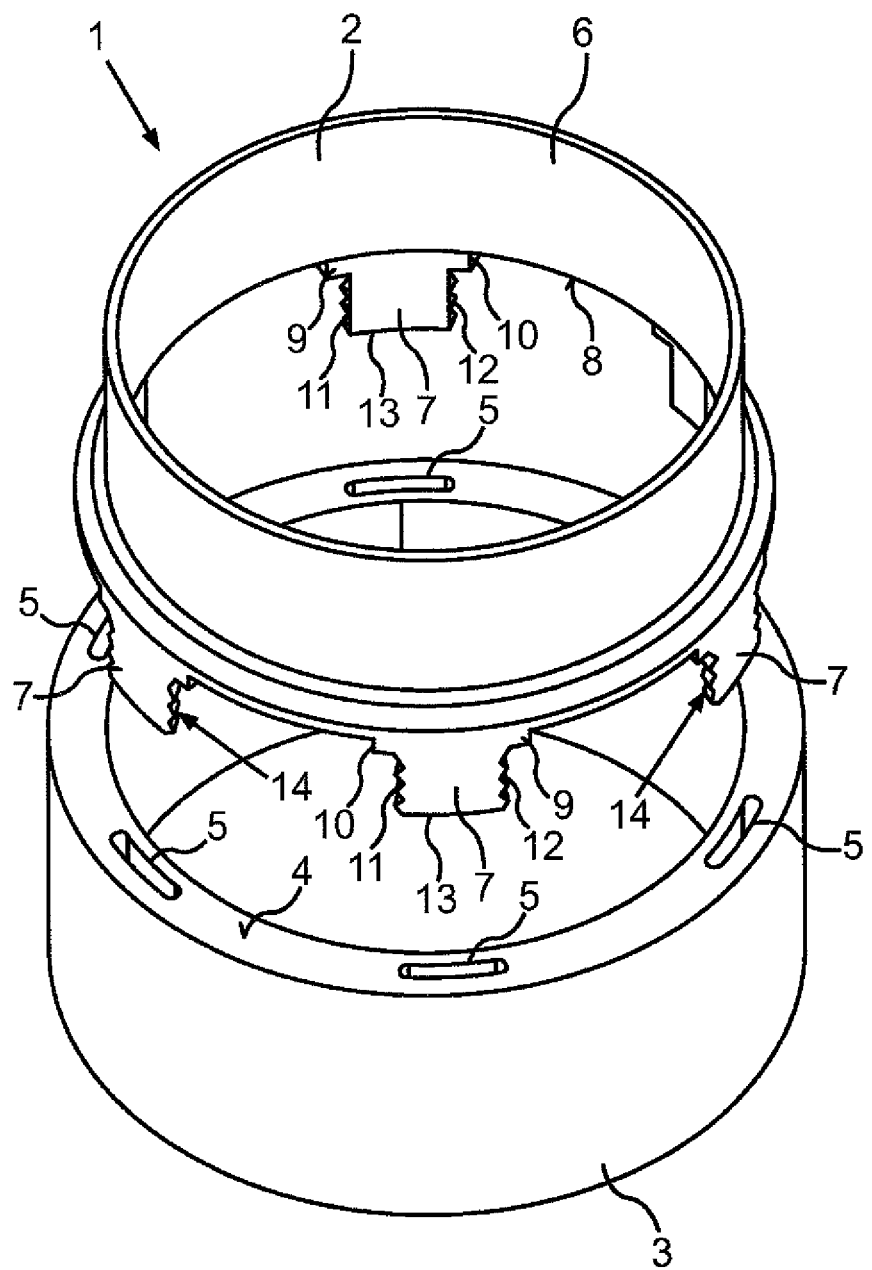

METHOD FOR PRODUCING A MAGNET UNIT FOR A SENSOR DEVICE OF A MOTOR VEHICLE, MAGNET UNIT, SENSOR DEVICE AND MOTOR VEHICLE

The invention relates to a method for producing a magnet unit for a sensor device for detecting a measured variable which characterizes a rotational state of a steering shaft of a motor vehicle. An annular magnet element is provided. Moreover, a sleeve is provided, via which the magnet unit can be connected to a shaft part of the steering shaft. The magnet element is connected to the sleeve. Moreover, the invention relates to a magnet unit for a sensor device of a motor vehicle, having an annular magnet element and a sleeve which is connected to the magnet element and via which the magnet unit can be connected to a shaft part. Furthermore, the invention relates to a sensor device and to a motor vehicle.

Torque sensor devices for detecting a torque which is applied to a steering shaft of a motor vehicle are already prior art. Torque sensor devices of this type can be used, for example, in electric steering systems. A torque sensor system of this type is known, for example, from document US 2004/0194560 A1 and from specification DE 102 40 049 A1. Here, the torque sensor device is attached to two shaft parts or sectional shafts of the steering shaft which lie opposite one another in the axial direction. A magnet, for instance a ring magnet, is arranged on the first shaft part, whereas a holder with a magnetic stator is attached on the other shaft part, which magnetic stator lies opposite the permanent magnet in the radial direction across a small air gap. The magnetic flux of the magnet is guided via the stator, which usually consists of two separate stator parts, toward a first and a second flux conductor which then output the magnetic flux to a magnet sensor, for example a Hall sensor.

A torque sensor device of this type is known, moreover, from document DE 10 2007 043 502 A1.

Moreover, steering angle sensor devices which serve to detect the current steering angle of the steering shaft are also known from the prior art. A device of this type can be gathered, for example, as known from document DE 10 2008 011 448 A1. Here, a rotational movement of the steering shaft is transmitted via a gear mechanism to a smaller gearwheel which carries a magnet. The rotation of the smaller gearwheel is then detected with the aid of a magnet sensor.

Apparatuses of the type, in which the torque sensor device firstly and the steering angle sensor device secondly are configured integrally as one common unit, also belong to the prior art.

In the present case, the interest is directed to a magnet unit of a torque sensor device or a combined torque and steering angle sensor device. A magnet unit of this type usually consists of said magnet element which is configured in the form of a permanent magnet, and of a metallic sleeve, via which the magnet unit is connected to the associated shaft part of the steering shaft. Whereas the sleeve is therefore formed from metal, the magnet element is as a rule made from a plastic which is filled with magnet particles and is relatively brittle on account of the high degree of filling. The sleeve can be fastened on the associated shaft part, for example, by means of adhesive bonding, welding, caulking or pressing.

One particular challenge consists in providing a reliable connection between the magnet element on one side and the sleeve on the other side. In the case of direct injection moulding of the magnet element onto the sleeve, shrinkage stresses namely occur during cooling of the plastic melt, which shrinkage stresses can lead, in particular in conjunction with the different coefficients of thermal expansion of the sleeve and the magnet element, to the formation of cracks in the magnet element at the temperature differences which occur during operation. For this reason, document EP 1 123 794 A1 proposes to fasten the magnet element to the sleeve not directly, but rather via an intermediate element made from an elastic material. In other words, the attachment between the magnet element and the metal sleeve is brought about via an elastic intermediate plastic in an additional injection moulding encapsulation process. This solution has proved relatively disadvantageous, however, because the very complicated positively locking connection of the parts to be connected and the sealing faces which are required for the injection moulding encapsulation process limit the different diameters which are desired as a rule of the sleeve and the magnet element and therefore the corresponding installation space. Moreover, the proposed solution is comparatively complicated and expensive.

A further solution as to how the sleeve can be connected to the magnet element is described in DE 198 36 451 C2. Here, the sleeve is encapsulated by injection moulding with the plastic bonded magnetic material, the sleeve having a tab-shaped part which is surrounded by the highly filled plastic and is arranged in the highly filled plastic in such a way that it absorbs shrinkage stresses of the plastic. Here, the connection of the sleeve to the magnet element therefore takes place in an injection moulding process, as a result of which in turn shrinkage stresses can be generated.

It is an object of the invention to indicate a solution as to how, in a method of the generic type mentioned at the outset, the sleeve and the magnet element can be connected to one another in a particularly reliable and failsafe manner, in particular without an additional intermediate element needing to be inserted in a complicated way.

According to the invention, this object is achieved by way of a method, by way of a magnet unit, by way of a sensor device and by way of a motor vehicle having the features in accordance with the respective independent patent claims. Advantageous embodiments of the invention are the subject matter of the dependent patent claims, the description and the FIGURE.

In a method according to the invention, a magnet unit is produced which is designed specifically for a sensor device which serves to detect a measured variable which characterizes a rotational state of a steering shaft of a motor vehicle, in particular a torque and/or a steering angle. An annular magnet element firstly and a sleeve secondly are provided. The bead-like sleeve serves to connect the magnet unit to an associated shaft part of the steering shaft. After the provision of the magnet element and the sleeve, the said parts are connected to one another. It is provided according to the invention that the sleeve is configured with a main body and a multiplicity of tabs which protrude from the main body, and the connection of the magnet element to the sleeve comprises the tabs being embedded into respective cut-outs of the magnet element with heating of the magnet element.

With the omission of an elastic intermediate piece, as is used in the prior art, the method according to the invention provides a magnet unit which has a particularly reliable, slip-proof and failsafe connection between the magnet element and the sleeve. Cracks in the magnet element can be prevented by virtue of the fact that the sleeve is not encapsulated by injection moulding with the plastic material, which cracks are produced in the prior art on account of shrinkage stresses. Moreover, the use of an elastic intermediate piece with the associated disadvantages with regard to the manufacturing complexity and the costs is unnecessary.

By way of the heating of the magnet element, the said magnet element is melted at least in the region of the cut-outs or within the cut-outs. As a result, a positively locking connection between the tabs on one side and the magnet element on the other side is formed during the introduction of the tabs into the respective cut-outs. As a result of the melting of the magnet element within the cut-outs, the tabs are enclosed tightly by the material of the magnet element, as a result of which an effective radial and/or axial positive locking connection is formed. In the unconnected state, the cut-outs of the magnet element are preferably a little smaller or tighter than the tabs, with the result that a particularly fixed seat of the tabs within the cut-outs can be ensured overall.

The tabs preferably protrude from the main body of the sleeve in the axial direction and therefore form axial projections which, in particular, protrude from an axial end side of the main body and point in the axial direction. The tabs are therefore received in the axial direction into the respective cut-outs and therefore extend axially into the respective cut-outs. A non-positive connection which can also withstand relatively large centrifugal forces is therefore additionally produced at least in the radial direction and in the circumferential direction.

The cut-outs are preferably formed by axial pockets which are configured on an axial end side of the magnet element. The said axial pockets can be configured in the form of slots which are of elongate configuration in the circumferential direction, but are relatively narrow in the radial direction. Said pockets can be of circumferentially closed configuration, with the result that they have merely a corresponding introduction opening for the tabs on the axial end side of the magnet element. A simple connection is therefore possible.

It proves advantageous if in each case at least one edge, in particular an axial edge or an edge which runs in the axial direction, of the tabs is configured with a tooth structure. A toothed edge of this type achieves a situation where, during plugging of the tabs into the respective cut-outs and during melting of the magnet element, the melted material of the magnet element passes into the toothed structure or into the gaps between the individual teeth, as a result of which a particularly fixed positively locking connection is ensured, in particular in the longitudinal direction of the tabs and preferably in the axial direction. In other words, the individual teeth of the tooth structure engage behind the material of the magnet element, with the result that renewed destruction-free separation of the two connecting partners is no longer possible after cooling of the magnet element.

The material of the magnet element can be heated and preferably melted in regions by virtue of the fact that the magnet element and/or the sleeve are/is loaded with ultrasound.

The connection of the two parts can therefore be carried out in an ultrasound process, in which mechanical oscillation is applied to the sleeve and/or the magnet element, by way of which mechanical oscillation a friction is produced which leads to heating of the material of the magnet element in the region of the connection. In this way, the two connecting partners can be connected to one another particularly reliably and without great complexity.

In addition or as an alternative, the heating can also comprise the tabs first of all being heated, in particular inductively and/or by means of a heated punch. The heated tabs can then be embedded into the respective cut-outs.

Here, the material of the magnet element is heated indirectly by way of the tabs which can be brought to such a temperature, at which the tabs can be received without great complexity into the narrower cut-outs with melting of the plastic material. This type of connection can also be implemented relatively simply.

The sleeve is preferably of single piece configuration, with the result that the main body and the tabs form an integral, single piece unit. The number of elements is therefore reduced to a minimum.

The single piece sleeve is therefore connected to the magnet element, in particular, directly and without the use of intermediate elements.

The magnet element can also be of single piece configuration.

The magnet element is preferably formed from filled plastic, that is to say from a plastic which is filled with magnet particles. The magnet element can therefore be melted partially without great complexity.

The sleeve is preferably configured from metal. A secure attachment to the steering shaft is therefore possible.

The tabs are designed, in particular, in such a way that they permit an equalization of thermal expansion between the two connecting partners over the axial length and partial openings in the sleeve circumference and/or in the main body.

Moreover, the invention relates to a magnet unit for a sensor device, having an annular magnet element and a sleeve which is connected to the magnet element and via which the magnet element can be connected to a shaft part. The sleeve has a main body and a multiplicity of tabs which protrude from the main body and are embedded into respective cut-outs of the magnet element, in particular in a positively locking manner.

A sensor device according to the invention is configured for detecting a measured variable which characterizes a rotational state of the steering shaft of a motor vehicle, and comprises a magnet unit according to the invention.

A motor vehicle according to the invention, in particular a passenger motor vehicle, comprises a sensor device according to the invention.

The preferred embodiments which are proposed in relation to the method according to the invention and their advantages apply correspondingly to the magnet unit according to the invention, to the sensor device according to the invention and to the motor vehicle according to the invention.

Further features of the invention result from the claims, the FIGURE and the description of the FIGURE. All the features and combinations of features mentioned above in the description and the features and combinations of features which are mentioned below in the description of the FIGURE and/or are shown solely in the FIGURE can be used not only in the respectively specified combination, but rather also in other combinations or else on their own.

The invention will now be explained in greater detail using one preferred exemplary embodiment and with reference to the appended drawing. Here, the single FIGURE shows a diagrammatic and perspective illustration of a magnet unit having a sleeve and a magnet element which are connected to one another.

A magnet unit 1 which is shown in the FIGURE is designed for use in a motor vehicle, in particular in a passenger motor vehicle. The magnet unit 1 is a constituent part of a sensor device which serves to detect a torque and/or a steering angle of the steering shaft. Here, the magnet unit 1 is fastened to a shaft part of the steering shaft.

The magnet unit 1 comprises a sleeve 2 which is formed from metal and a magnet element 3 which is a permanent magnet. The magnet element 3 is formed from a plastic which is filled with magnet particles.

The magnet element 3 is of annular and bead-like configuration. Cut-outs 5 which are configured as axial depressions in the end side 4 are configured on an axial end side 4 of the magnet element 3 in the axial direction. The cut-outs 5 are circumferentially closed pockets which are of slot-shaped configuration. The cut-outs 5 are arranged such that they are distributed equidistantly in the circumferential direction. For example, three or four or five or six or seven or more cut-outs 5 of this type can be provided.

The slot-shaped cut-outs 5 are of elongate configuration in the circumferential direction. In contrast, they are relatively narrow in the radial direction.

The sleeve 2 has a main body 6 and a multiplicity of tabs 7 which are configured in one piece with the main body 6 and protrude from the main body 6 in the axial direction. The number of tabs 7 corresponds in this case to the number of cut-outs 5. The tabs 7 which correspond with the cut-outs 5 are likewise of relatively narrow configuration in the radial direction, but are of elongate configuration in the circumferential direction and are therefore of tooth-shaped configuration overall. They point in the axial direction. The tabs 7 are likewise arranged such that they are distributed equidistantly in the circumferential direction.

Here, the tabs 7 protrude axially from an axial end side 8 of the annular main body 6, with the result that they form axial projections overall. Here, the sleeve 2 is designed in such a way that the tabs 7 are attached to the axial end side 8 of the main body 6 via a web 9 which is a little wider in the circumferential direction. Here, the webs 9 form a stop, up to which the tabs 7 can be received into the respective cut-outs 5. Because the webs 9 are distributed in the circumferential direction, axial depressions 10 which are likewise distributed in the circumferential direction are configured between the webs 9. A gap between the axial end side 8 of the main body 6 on one side and the axial end side 4 of the magnet element 3 on the other side is formed by way of the said depressions 10 in the connected state. The said axial gap has, in particular, the advantage that a compensation of the thermal expansion between the sleeve 2 and the magnet element 3 is made possible.

Each tab 7 has in each case two axial edges 11, 12 which run in the axial direction or parallel to the axis. The two axial edges 11, 12 are connected via an end edge 13 which runs in the circumferential direction and is arranged perpendicularly with respect to the edges 11, 12. It is provided in the exemplary embodiment that the axial edges 11, 12 of each tab 7 have a tooth structure 14.

The tabs 7 are a little wider at least in the circumferential direction than the cut-outs 5. The tabs 7 can also optionally be a little wider in the radial direction than the cut-outs 5.

The connection of the sleeve 2 to the magnet element 3 is as follows: the end edges 13 of the tabs 7 are first of all brought into contact with the axial end side 4 of the magnet element 3, with the result that the tabs 7 lie above the respective cut-outs 5. The sleeve 2 and/or the magnet element 3 are/is then loaded with ultrasound, with the result that a mechanical oscillation is applied and the material of the magnet element 3 is heated on account of the friction. Here, the heat is generated in the region of the cut-outs 5, with the result that the magnet element 3 is melted in the region of the cut-outs 5 and the tabs 7 are received into the cut-outs 5.

In this way, the tabs 7 are embedded in a positively locking manner into the respective cut-outs 5, the melted material of the magnet element 3 passing into the tooth structure 14. The tabs 7 are plugged in until the webs 9 are brought into contact with the axial end side 4 of the magnet element 3. A positively locking connection is therefore formed both in the axial direction and in the radial direction and in the circumferential direction.

In addition or as an alternative to the ultrasound process, the tabs 7 can also be heated in advance by means of a heated punch and/or inductively. This heating also ensures low-complexity joining of the sleeve 2 to the magnet element 3.

The invention claimed is:

1. A method for producing a magnet unit for a sensor device for detecting a measured variable that characterizes a rotational state of a steering shaft of a motor vehicle, comprising:
   connecting an annular magnet element to a sleeve, the sleeve being for connecting the magnet unit to a shaft part of the steering shaft,
   wherein the sleeve is configured with a main body and a plurality of tabs that protrude from the main body, and the connection comprises the tabs being embedded into respective cut-outs of the magnet element with heating of the magnet element, and
   wherein at least one axial edge of each tab of the plurality of tabs is configured with a tooth structure.

2. The method according to claim 1, wherein as a result of the heating, the magnet element is melted within the cut-outs and, and as a result, a positively locking connection is formed between the tabs on one side and the magnet element on the other side.

3. The method according to claim 1, wherein the tabs protrude from the main body in the axial direction and are received into the respective cut-outs in the axial direction.

4. The method according to claim 1, wherein the cut-outs are formed by slot-like, axial pockets which are configured on an axial end side of the magnet element.

5. The method according to claim 1, wherein the heating is carried out by way of loading of the magnet element and/or the sleeve with ultrasound.

6. The method according to claim 1, wherein the heating comprises the tabs first of all being heated, in particular inductively and/or by means of a heated punch, and then being embedded into the respective cut-outs.

7. The method according to claim 1, wherein the sleeve is configured in one piece.

8. The method according to claim 1, wherein the sleeve is made from metal.

9. The method according to claim 1, wherein the magnet element is made from filled plastic.

10. A magnet unit for a sensor device for detecting a measured variable that characterizes a rotational state of a steering shaft of a motor vehicle, the magnet unit comprising:
    an annular magnet element and a sleeve, which is connected to the magnet element, and via which the magnet unit can be connected to a shaft part of the steering shaft,
    wherein the sleeve has a main body and a plurality of tabs that protrude from the main body and are embedded into respective cut-outs of the magnet element in a positively locking manner, and
    wherein at least one axial edge of each tab of the plurality of tabs is configured with a tooth structure.

11. A sensor device for detecting a measured variable which characterizes a rotational state of a steering shaft of a motor vehicle, comprising the magnet unit according to claim 10.

12. A motor vehicle having a sensor device according to claim 11.

* * * * *